A. GLEINICH.
PROJECTILE FOR HAND FIREARMS.
APPLICATION FILED JAN. 8, 1909.
Reissued Mar. 16, 1909. 12,927.
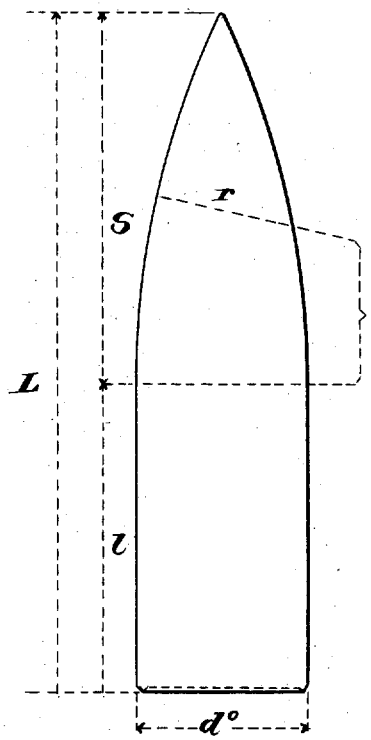
Witnesses
J. M. Fowler Jr.
M. B. Taylor.
Inventor
Arthur Gleinich
By George Maxwell
His Attorneys

UNITED STATES PATENT OFFICE.

ARTHUR GLEINICH, OF KÖNIGS-WUSTERHAUSEN, GERMANY, ASSIGNOR TO DEUTSCHE WAFFEN-UND MUNITIONSFABRIKEN, OF BERLIN, GERMANY.

PROJECTILE FOR HAND-FIREARMS.

No. 12,927. Specification of Reissued Letters Patent. Reissued March 16, 1909.

Original No. 841,861, dated January 22, 1907, Serial No. 246,549. Application for reissue filed January 8, 1909. Serial No. 471,364.

*To all whom it may concern:*

Be it known that I, ARTHUR GLEINICH, engineer, a subject of the German Emperor, residing at Friedrichstrasse 3, Königs-Wusterhausen, Germany, have invented a new and useful Improved Form of Projectiles for Hand-Firearms, of which the following is a specification.

This invention relates to projectiles, and particularly those designed for use in small arms at high pressures and great velocities.

Heretofore the search for an ideal projectile has not been merely a matter of mathematical calculation based upon ballistic principles, but rather a succession of experiments upon theoretical lines suggested by such calculations, the reason being that the action of the projectile in flight is modified by many extraneous forces—such as the resistance of the air, the head-wave, suction, etc.—all of which influence and are influenced in a varying degree by the constantly-changing velocity of the projectile.

Recent researches by photography of flying projectiles, according to known methods, at different velocities serve to indicate the pointed nose as productive of the most desirable form of head-wave for projectiles at high velocities; but any conclusions based hereon have been and must be qualified by other requirements and conditions present as to course of flight, range, penetration, stopping effect, etc., and these are only satisfied by a proper combination of body dimensions, distribution of mass, and form of body and head.

I have as a result of extensive research and experiment ascertained that the projectile best meeting all requirements of a small-arm shooting at high velocities—say in excess of five hundred meters per second—is that forming the subject of my present invention, as hereinafter more particularly described and claimed and as set out for purposes of illustration in the accompanying drawing.

As will be seen by an inspection of the drawing, the new projectile consists of two parts—the cylindrical body or guide part $l$ and the head $s$, the lines of which latter are curved upon a fixed radius $r$. Each of these two constitutes about one-half of the total length of the projectile.

Taking the caliber of the gun or the diameter $d°$ of the projectile-body as unity the dimensions of a projectile of my preferred form may be given as follows: length of body $l$, 1.85; length of head $s$, 2.19; radius of curvature of head $r$, 4.7 to 8.2; radius of curvature of nose-point, .5 millimeters. The dimensions given are those found to be best adapted for general requirements; but some deviations are permissible and may, to meet special conditions, be desirable. Such deviations, however, should, to obtain the best results, be within the following limits, again taking the caliber as unity: for the length of body $l$, + or − .60; for the length of head $s$, + .46 or − .37. A projectile constructed according to these relative dimensions is found to possess a capacity for speed of flight in excess of the ordinary projectile, great penetration, superior stopping effect, flat trajectory, accuracy, and extended range.

Having fully described my invention, what I claim as new, and desire to secure by Letters Patent of the United States, is—

1. A projectile having a pointed head of substantially one-half the total length of the projectile, and having its other dimensions substantially as set forth.

2. A projectile having a pointed head formed by lines curved upon a radius of four to nine fold the caliber, and having its other dimensions substantially as set forth.

3. A projectile having a pointed head of substantially one-half the total length of the projectile and curved upon a radius of four to nine fold the caliber, and having its other dimensions substantially as set forth.

4. A projectile having a body part substantially 1.85 calibers in length, and a pointed head substantially 2.19 calibers long, and having its other dimensions substantially as set forth.

5. A projectile having a body part substantially 1.85 calibers in length, and a pointed head substantially 2.19 calibers long, the lines of the pointed head being curved upon a radius of from 4.7 to 8.2 calibers.

6. A projectile having a body part substantially 1.85 calibers in length, and a pointed head substantially 2.19 calibers long, the lines of the pointed head being curved upon a radius of from 4.7 to 8.2 calibers, and the head terminating in a point curved upon a radius of substantially .5 millimeters.

In testimony whereof I have signed my name to this specification in the presence of two subscribing witnesses.

ARTHUR GLEINICH.

Witnesses:
WOLDEMAR HAUPT,
HENRY HASPER.